United States Patent Office 3,520,869
Patented July 21, 1970

3,520,869
4-NITROBENZENE-AZO-2',5'-DIMETHOXY-ACETOACETANILIDE PIGMENTS
Emil Stocker, Riehen, Switzerland, assignor to J. R. Geigy A.G., Basel, Switzerland
No Drawing. Filed Mar. 27, 1967, Ser. No. 625,975
Int. Cl. C09b *29/32;* C07c *107/04*
U.S. Cl. 260—193
8 Claims

ABSTRACT OF THE DISCLOSURE 4-nitro - benzene - azo - 2',5'-dimethoxy-acetoacetanilide pigments substituted in 2-position by lower alkoxy, fluorine or chlorine and in 4'-position by chlorine or bromine, which are useful, because of their purity of shade and colour strength as well as their light fastness, as colouring component in printing inks and in rayon spinning masses; printing inks and rayon spinning masses containing the aforesaid novel pigments; and prints on substrate materials, as well as rayon coloured therewith.

BACKGROUND OF THE INVENTION

Field of the invention

The present invention concerns new monoazo pigments, a process for their production, their use for the pigmenting of high molecular organic material and, as industrial products, materials pigmented therewith.

Description of the prior art

The lack of strongly coloured, pure yellow pigments having good fastness to light, particularly for the production of printing inks for the graphic industry, is known. Among others, also pure, reddish yellows are needed which, along or combined with other pigments, enable golden, orange and brown shades to be produced. In addition, printing inks obtained with such yellow pigments should have good rheological properties even at a high pigment concentration and the prints produced therewith should be brilliant and transparent.

Compared with the known important yellow pigments of the benzidine series obtained according to German Pat. No. 921,404 and Belgian Pat. No. 638,512 by coupling tetrazotised 3,3'-dichlorobenzidine and 2,5-dimethoxy - 4 - chloro- or -4-bromo-acetoacetanilide, the new pigments have the advantage that 3,3'-dichlorobenzidine which is injurious to health can be dispensed with. Compared with the yellow pigment obtained from diazotised 1-amino - 2 - methoxy-4-nitrobenzene and 2-methoxy - acetoacetanilide described in U.S. Pat. No. 3,032,546, the new pigments have considerably more reddish shades which cannot be compared and they cannot be replaced by this known pigment. In addition, the new pigments are superior to the known yellow pigment produced from diazotised 1-amino-4-nitrobenzene and 2,5-dimethoxy-4-chloro-acetoacetanilide with regard to their more reddish shade and their substantially better colour strength, for example, in lacquers, varnishes and printing inks. This previously known monoazo pigment has also the disadvantage that easily flowing, strongly coloured, reddish yellow printing inks cannot be produced with it. Also, the pigments according to the invention are considerably more light fast than the pigment known from U.S. Pat. No. 1,051,565 produced from diazotised 1-amino-2-methoxy-4-nitrobenzene and 2 - chloro-acetoacetanilide.

SUMMARY OF THE INVENTION

More in particular, the invention provides new monoazo pigments of the formula

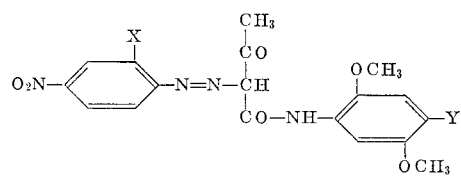

wherein X represents a low alkoxy group, fluorine or chlorine, and Y represents chlorine or bromine, which are useful for the pigmenting of high molecular organic materials, chiefly for the pigmenting of printing ink binders for the graphic industry, mainly for paper printing, but also for the pigmenting of paper in the pulp and for the coating of paper in general.

For example, they can be used for the pigmenting of wrapping paper or placards, the printing or coating of wall papers and fancy papers or for the production of paper laminates. The pigments can also be used, however, e.g. in paints having an oily foundation such as linseed oil colours, or paints having an aqueous foundation such as dispersion colours, in lacquers of various types such as nitro or alkyd resin lacquers, also for the pigmenting of plastics such as polyethylene, polystyrene, polyvinyl chloride, particularly hard polyvinyl chloride, and also curable resins, cellulose esters, particularly for the colouring of viscose or acetate rayon spinning masses as well as for pigment printing and padding of textiles.

The new pigments colour these materials in pure, reddish yellow, light-fast shades of very good colour strength. The high colour strength makes the production of easily flowing, strongly coloured printing inks and therefore relatively thin printing films possible which is of particular importance in the graphic industry. When used in printing inks, also the beautiful brilliancy and transparency of the prints obtained with the new pigments as well as their good fastness to cross-lacquering are to be mentioned. Transparency is also very desirable in the colouring of artificial silk spinning masses. Moreover, the fastness to oils and to solvents of the new yellow pigments is good.

It is particularly surprising that, in contrast to the previously known monoazo pigments discussed hereinbefore, all of the valuable properties which distinguish the pigments favourably thereover, occur simultaneously in the new pigments.

DESCRIPTION OF THE INVENTION AND PREFERRED EMBODIMENT THEREOF

The pigments according to the invention are obtained by coupling the diazonium compound of an amine of the formula

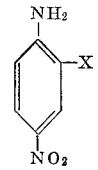

(I)

wherein X represents a low alkoxy group or the halogens fluorine or chlorine, with a coupling compound of the formula

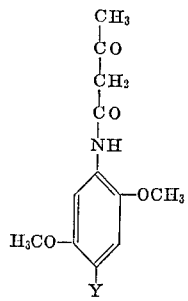

(II)

wherein Y represents chlorine or bromine, to form a monoazo pigment of Formula III

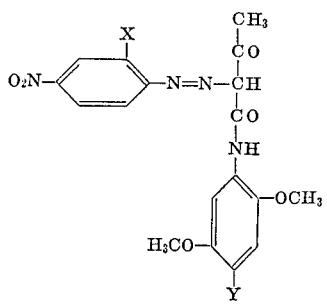

(III)

wherein X has the meaning given in Formula I and Y has that given in Formula II.

A lower alkoxy group in the position of X has at most 5 carbon atoms and is, e.g. the methoxy or, preferably, the ethoxy group. When X represents halogen, it is preferably chlorine.

The coupling is advantageously performed in aqueous or aqueous-organic, preferably weakly acid, in particular acetic acid, solution or suspension. To accelerate the coupling or to affect the particle size and crystal form of the pigment formed, auxiliaries known per se can be added to the coupling mixture, for example water-miscible organic solvents such as low alkanols, e.g. methanol, ethanol, ethylene glycol monomethyl or monoethyl ether, cyclic aliphatic ethers, e.g. dioxane, low fatty acids such as formic acid, or acetic acid, low fatty acid amides such as dimethyl formamide, or certain tertiary nitrogen bases, e.g. triethanolamine or pyridine, also non-water-miscible organic solvents such as optionally halogenated or nitrated aromatic hydrocarbons, e.g. benzene, toluene, chlorobenzene, nitrobenzene or tetrahydronaphthalene, also non-ionogenic, anion active or cation active dispersing agents— in particular the addition products of more than one equivalent of alkylene oxide, particularly ethylene oxide, to fatty alcohols or fatty acids are suitable as such, also condensation products of naphthalene sulphonic acids with formaldehyde or, e.g. lauryldimethylbenzylammonium chloride, also resins or resinous soaps, e.g. those based on rosen, protective colloids such as casein or methyl cellulose, oils, plasticisers or solid colourless substrata such as barium sulphate or hydrates of alumina.

The new monoazo pigments precipitate from the coupling mixture. They are isolated in the usual way by filtration and purified by washing. Depending on the intended use, the crude pigment filter press cake can be dried and milled, worked up into aqueous doughs and pastes or flushed into organic media. The pigments can also be worked up with auxiliaries such as carrier resins into granular or pulverulent preparations.

To improve the colour strength and/or to alter the shade, the new pigments can be produced also in admixture with each other or with other pigments. Thus, for example, up to 30% of the diazo component of Formula I or the coupling component of Formula II can be replaced by another diazo component of the nitraniline series or by another coupling component of the acetoacetanilide series.

The pigment of Formula III which can be produced according to the invention wherein X represents the ethoxy group and Y represents a chlorine atom is particularly valuable. When applied to printing inks it shows outstanding brilliancy and a particuarly good colour strength.

The following non-limitative examples illustrate the invention. Therein the temperatures are given in degrees centigrade. Percentages are given by weight unless expressly stated otherwise.

EXAMPLE 1

1.68 g. of 1-amino-2-methoxy-4-nitrobenzene are dissolved in 25 ml. of glacial acetic acid whereupon 15 ml. of 2 N hydrochloric acid are added to the solution. At 10° while stirring, 10.5 ml. of 1 N sodium nitrite solution are added all at once quickly afterwards to this mixture and the diazonium salt solution obtained is stirred for 30 minutes at room temperature. Separately, 2.81 g. of 2,5-dimethoxy - 4 - chloro - acetoacetanilide are dissolved in 80 ml. of methanol and 0.25 g. of an addition product of 20 mols of ethylene oxide to 1 mol of stearyl alcohol, dissolved in 5 ml. of water, and 10.5 ml. of 2 N sodium acetate solution are added to the solution. Coupling is then performed by pouring the filtered diazonium salt solution into the 20° warm solution of the coupling component while stirring, the addition being made within 10 minutes. The pigment suspension formed is then heated for 5 minutes at 40°, filtered under suction, the residue is washed neutral with water, dried at 50° and pulverised.

The pigment so produced is a yellow powder and is excellently suitable for the production of printing inks for the graphic industry and gives very strong, pure, reddish yellow prints of good brilliancy, good transparancy and having very good fastness to light. Combined with red printing inks, very pure orange shades, for example, can be obtained.

If instead of the 1-amino-2-methoxy-4-nitrobenzene, an equimolecular amount of 1-amino-2-chloro - 4 - nitrobenzene is used, then with otherwise the same procedure as given in the example, pigment having similarly valuable properties is obtained.

EXAMPLE 2

8.40 g. of finely pulverised 1-amino-2-methoxy-4-nitrobenzene are added to 146 ml. of 2 N hydrochloric acid while stirring and the whole is stirred for another 2 hours at 25°. 60 g. of crushed ice are then added to the mixture and the amine is diazotised at 0–2° by adding dropwise 10.35 g. of 33.3% sodium nitrite solution within 1 hour. The diazonium salt solution obtained is then clarified, and 100 ml. of ice water and 52.2 ml. of 0–2° cold 2 N sodium acetate solution are added. Immediately afterwards and while stirring, a 2° cold solution of 14.00 g. of 2,5-dimethoxy-4-chloro-acetoacetanilide in 108 ml. of 2 N sodium hydroxide solution and 525 ml. of water are added dropwise within 30 minutes, the temperature is kept for 30 minutes at 0–2° and then raised to 40° within half an hour. The pigment formed is filtered off, washed with water, dried at 60° and then pulverised.

The pigment so obtained is a reddish yellow powder.

Similarly strong and pure reddish yellow prints are obtained in printing inks with it as with the pigment produced according to Example 1, paragraph 1.

If instead of 1-amino-2-methoxy-4-nitrobenzene, 8.63 g. of 1-amino-2-chloro-4-nitrobenzene is used and otherwise the procedure described in Example 2 is followed, then a yellow pigment having similar properties is obtained.

EXAMPLE 3

1.82 g. of 1-amino-2-ethoxy-4-nitrobenzene are dissolved in 25 ml. of glacial acetic acid, 15 ml. of 2 N hydrochloric acid are added to this solution, the latter is cooled to 10° and the amine is diazotised while stirring by rapidly pouring in 10.5 ml. of 1 N sodium nitrite solution.

Separately, 2.81 g. of 2,5-dimethoxy-4-chloro-acetoacetanilide are dissolved in 100 ml. of methanol while adding 0.15 g. of an addition product of 20 mols ethylene oxide to 1 mol of stearyl alcohol dissolved in 3 ml. of water, and 10 ml. of 2 N sodium acetate solution.

The filtered diazonium salt solution is then added to the solution of the coupling component within 7 minutes while stirring and the pigment suspension formed is heated to 40° within 30 minutes. Then the pigment is filtered off, washed with water, dried at 60° and pulverised.

The product so obtained is excellently suitable for the production of printing inks for the graphic industry, and it yields reddish yellow prints having great colour strength and excellent fastness to light.

EXAMPLE 4

1.68 g. of 1-amino-2-methoxy-4-nitrobenzene are dissolved in 25 ml. of glacial acetic acid. Then 15 ml. of 2 N hydrochloric acid are added to the solution and the mixture is cooled to 10°. While stirring, the amine is diazotised by rapidly pouring in 10.5 ml. of 1 N sodium nitrite solution.

Separately, 3.28 g. of 2,5-dimethoxy-4-bromo-acetoacetanilide are dissolved at 25° in 100 ml. of methanol and 0.35 g. of an addition product of 20 mols of ethylene oxide and 1 mol of stearyl alcohol dissolved in 7 ml. of water, and 10 ml. of 2 N sodium acetate solution are added. While stirring, the clarified diazonium salt solution is then poured into the solution of the coupling component within 10 minutes and the suspension is heated to 40° within 30 minutes. On completion of the coupling reaction the pigment formed is filtered off, washed with water, dried at 60° and pulverised.

The pigment so obtained yields a very strongly coloured reddish yellow shade. It is excellently suitable for the production of printing inks for the graphic industry, and it yields very strongly coloured, pure, reddish yellow prints having very good light-fastness.

EXAMPLE 5

1.82 g. of 1 - amino-2-ethoxy-4-nitrobenzene are dissolved in 25 ml. of glacial acetic acid, 15 ml. of 2 N hydrochloric acid are added, the solution is cooled to 10° and the amine is diazotised by rapidly pouring in 10.5 ml. of 1 N sodium nitrite solution while stirring.

Separately, 3.26 g. of 2,5-dimethoxy-4-bromo-acetoacetanilide are dissolved in 200 ml. of methanol and 10 ml. of 2 N sodium acetate solution are added to the solution. While stirring, the filtered diazonium salt solution is poured into the solution of the coupling component within 7 minutes and the suspension formed is then heated to 40° within 30 minutes. On completion of the coupling reaction the precipitated pigment is filtered off, washed with water, dried at 60° and pulverised.

The pigment so obtained yields a strongly coloured reddish yellow shade. It is suitable for the production of printing inks for the graphic industry and it yields reddish yellow, strongly coloured prints having very good light-fastness properties.

EXAMPLE 6

1.00 g. of the pigment produced according to Example 3, paragraphs 1 to 3, is finely ground in an Engelsmann automatic muller with 4.00 g. of a printing lacquer of the composition 29.4% of linseed stand oil (300 poise),
67.2% of linseed stand oil (20 poise),
2.1% of Octa Soligen Cobalt (8% Co) [Farbwerke Hoechst, Frankfurt am Main, Germany] and
1.3% of Octa Soligen lead (24% Pb)

and then printed on coated paper with the aid of a cliché in the letterpress process with 1 g. of printing ink per sq.m. A strong, pure, reddish yellow shade having good transparency, good brilliancy and very good fastness to light is obtained.

The pigment is also suitable for other printing processes such as rotogravure, offset, flexographic printing and here too gives very good results.

I claim:
1. A compound of the formula

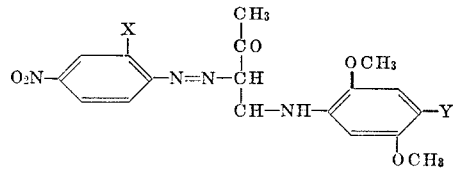

wherein:
X represents lower alkoxy, and
Y represents chlorine or bromine, or both
X and Y represents chlorine.

2. A compound as defined in claim 1, wherein Y represents chlorine.

3. A compound as defined in claim 1, wherein Y represents bromine.

4. A compound as defined in claim 2, wherein X represents methoxy.

5. A compound as defined in claim 2, wherein X represents chlorine.

6. A compound as defined in claim 2, wherein X represents ethoxy.

7. A compound as defined in claim 3, wherein X represents methoxy.

8. A compound as defined in claim 3, wherein X represents ethoxy.

References Cited

UNITED STATES PATENTS

| | | | |
|---|---|---|---|
| 1,051,565 | 1/1913 | Desamari | 260—193 |
| 1,947,028 | 9/1932 | Woodward | 260—193 |
| 2,112,764 | 9/1934 | Dahlen, et al. | 260—193 X |
| 2,203,038 | 11/1938 | Zitscher et al. | 260—193 |
| 3,032,546 | 5/1962 | Johnson | 260—193 |

CHARLES B. PARKER, Primary Examiner

C. F. WARREN, Assistant Examiner

U.S. Cl. X.R.

8—4, 41, 50; 106—23, 204